(12) United States Patent  (10) Patent No.: US 7,149,352 B2
Fujiwara                   (45) Date of Patent: Dec. 12, 2006

(54) IMAGE PROCESSING DEVICE, PROGRAM PRODUCT AND SYSTEM

(75) Inventor: Yoko Fujiwara, Tokyo (JP)

(73) Assignee: Minolta Co., Ltd., Osaka (JP)

( * ) Notice: Subject to any disclaimer, the term of this patent is extended or adjusted under 35 U.S.C. 154(b) by 895 days.

(21) Appl. No.: 09/892,617

(22) Filed: Jun. 28, 2001

(65) Prior Publication Data
US 2002/0015524 A1   Feb. 7, 2002

(30) Foreign Application Priority Data
Jun. 28, 2000 (JP) ............................. 2000-195146

(51) Int. Cl.
G06K 9/00 (2006.01)
(52) U.S. Cl. .................................... 382/181
(58) Field of Classification Search ........ 382/170–171, 382/176, 178, 181, 187, 209, 229, 231, 310, 382/311, 182, 218
See application file for complete search history.

(56) References Cited

U.S. PATENT DOCUMENTS

| 4,850,025 A | * | 7/1989 | Abe ........................... 382/220 |
| 5,033,098 A | * | 7/1991 | Tanaka et al. ............... 382/171 |
| 5,719,969 A | * | 2/1998 | Taguchi ....................... 382/311 |
| 5,815,704 A | * | 9/1998 | Shimotsuji et al. ......... 707/100 |
| 5,881,168 A | * | 3/1999 | Takaoka et al. ............ 382/180 |
| 5,949,906 A |   | 9/1999 | Hontani et al. |
| 6,052,480 A | * | 4/2000 | Yabuki et al. .............. 382/178 |
| 6,341,176 B1 | * | 1/2002 | Shirasaki et al. ........... 382/229 |
| 6,721,463 B1 | * | 4/2004 | Naoi et al. .................. 382/305 |
| 6,738,519 B1 | * | 5/2004 | Nishiwaki ................... 382/228 |

FOREIGN PATENT DOCUMENTS

| JP | 05-037700 | 2/1993 |
| JP | 08-055185 | 2/1996 |
| JP | 09-091371 | 4/1997 |
| JP | 10-290349 | 10/1998 |
| JP | 10-313372 | 11/1998 |

* cited by examiner

Primary Examiner—Daniel Mariam
(74) Attorney, Agent, or Firm—Buchanan Ingersoll & Rooney PC

(57) ABSTRACT

A computer 10 having a function as an image processing device includes an output format judgment unit that makes a judgment after recognizing character code for character images in the input image data whether the character image should be converted into character code data using the degree of character recognition certainty Cn as well as the degree of character continuity Pn, which is the degree of continuity between the character image and neighboring character images. The degree of character continuity is obtained by detecting the distance from the neighboring characters, the difference in font size, the difference in font type, the length of the character string, and the color difference.

21 Claims, 13 Drawing Sheets

FIG.2 RELATED ART

It's Perfect!
Maxy's fresh - picked fruit is always the perfect gift. —E₂
Everyone will appreciate your thoughtfulness.
    Pineapples    #001-cc    $30.00
    Navel Oranges    #002-cc    $25.00
    Red Grapes    #003-cc    $20.00
Order now! Your satisfaction is guaranteed.
Phone : ( 800 ) 123-4567
Internet : http://www.maxy-fruit.dot.com —E₂

E₁
V 1L
4- +

IMAGE PROCESSING DEVICE, PROGRAM PRODUCT AND SYSTEM

This application is based on the Japanese Patent Application No. 2000-195146 filed on Jun. 28, 2000, the contents of which are hereby incorporated by reference.

BACKGROUND OF THE INVENTION

1. Field of the Invention

The present invention relates to a device, a program product and a system for image processing. In particular, the invention relates to a device, a program product and a system for executing a process to judge whether character images in input image data should be converted into character code data.

2. Description of the Related Art

Latest image recognition devices can recognize character images as character codes with extremely high accuracies as long as the documents are of good scanning conditions (for example if a document is made up of a single font type). However, if the quality of characters on the document is bad, or if the layout of characters or the like on the document is complicated, the accuracy of recognizing character images as character codes drops substantially and character image recognition errors occur more frequently.

In order to cope with such a problem, systems have been known wherein the entire image data obtained by scanning the document is stored as a back up. However, the volume of a file containing the backup image data naturally becomes substantially larger than the input image data.

Therefore, other systems have been proposed wherein only the character images that have high probability of recognition errors are outputted as character image data (e.g., bitmap type image data) without converting them into character code data. The probability of recognition errors is judged from information on certainty of recognizing character codes measured by checking similarity with the pre-recorded standard character pattern, etc.

However, the information on certainty of recognizing character codes alone does not provide a sufficient accuracy for a judgment on which character images in the image data are accurately recognized as character codes and which character images are mistakenly recognized, so that it is difficult to remove mistakenly recognized character images completely.

The types of documents to be scanned have become quite diversified in recent years, many of them being color documents or documents with complex layouts. As a result, it has become increasingly difficult to extract from image data character areas where character images exist. Therefore, scanning of a document such as the one shown in FIG. 1, where non-character graphics are embedded in character areas, may result in outputting character code data as a result of mistakenly recognizing character codes from graphic images, i.e., non-character images in the obtained image data, as shown in FIG. 2. The symbol E1 in the drawing represents character code data obtained from character codes mistakenly recognized from graphic images, and the symbol E2 represents character code data obtained from character codes mistakenly recognized from character images. Moreover, there are cases where the certainty of recognizing character codes in converting graphic images to character code data E1 is not much different from the same for true character images. Therefore, it is impossible to remove the character code data obtained by mistakenly recognizing graphic images, if a judgment for converting into character code data is made only on the information of certainty of recognizing character codes.

Unexamined Publication No. JP-A-8-55185 proposed a technology of extracting character areas by means of checking positional relation with neighboring character images in the stage of extracting character areas where character images exist in the image data. U.S. Pat. No. 5,949,906 proposed a technology of first extracting character candidate areas which can be candidates for character areas by checking positional relation with neighboring character images, and then reconstruct character areas based on character images for which character codes can be recognized among image data in the character candidate areas. However, all of these technologies are nothing but the technologies to extract character areas from the image data.

SUMMARY OF THE INVENTION

It is an object of the present invention to provide an improved image processing device, a program product and a system to solve the above problems.

It is a further object of the present invention to provide an image processing device, a program product and a system that are capable of effectively preventing the output of mistakenly recognized character code data while increasing the ratio of conversion of character images contained in input image data to character code data.

According to an aspect of the invention, it is an image processing device comprising: a character recognition unit that recognizes character codes from character images in image data; a conversion unit for converting character images to character code data according to character codes; and a judgment unit that obtains a degree of character continuity, which is a degree of continuity between a character image and neighboring character images thereof, for any character image for which a character code has been recognized by said character recognition unit, and that makes a judgment on whether said character image should be converted into character code data based on said degree of character continuity.

According to this invention, it is possible to prevent graphic images, or non-character images, from being mistakenly recognized as character images and outputted as character code data by judging whether character images should be converted into character code data based on the degree of character continuity after character codes are recognized from character images. Moreover, it becomes possible to remove mistakenly recognized character code data without having to set up a severe threshold value in judging the certainty of recognizing character codes by means of using the degree of character continuity, so that it is possible to maintain a high rate of conversion of character images contained in the input image data into character code data.

According to another aspect of the invention, it is a program product for image processing, said program product causing a computer to execute a process comprising the steps of: 1) recognizing character codes from character images in image data; 2) obtaining a degree of character continuity between a character image and neighboring character images thereof for any character image to which a character code has been recognized at said step 1); and 3) making a judgment on whether said character image should be converted into character code data based on said degree of character continuity.

According to still another aspect of the invention, it is an image processing system, comprising a scanning device for scanning documents to obtain image data; and an image processing device comprising: a character recognition unit that recognizes character codes from character images in image data; a conversion unit for converting character images to character code data according to character codes; and a judgment unit that obtains a degree of character continuity, which is a degree of continuity between a character image and neighboring character images thereof, for any character image for which a character code has been recognized by said character recognition unit, and that makes a judgment on whether said character image should be converted into character code data based on said degree of character continuity.

The objects, features, and characteristics of this invention other than those set forth above will become apparent from the description given herein below with reference to preferred embodiments illustrated in the accompanying drawings.

BRIEF DESCRIPTIONS OF THE DRAWINGS

FIG. 2 is a drawing that shows an example wherein character recognition process is applied to image data obtained by scanning the document of FIG. 1 and outputted by a conventional image recognition device;

Figure 6:
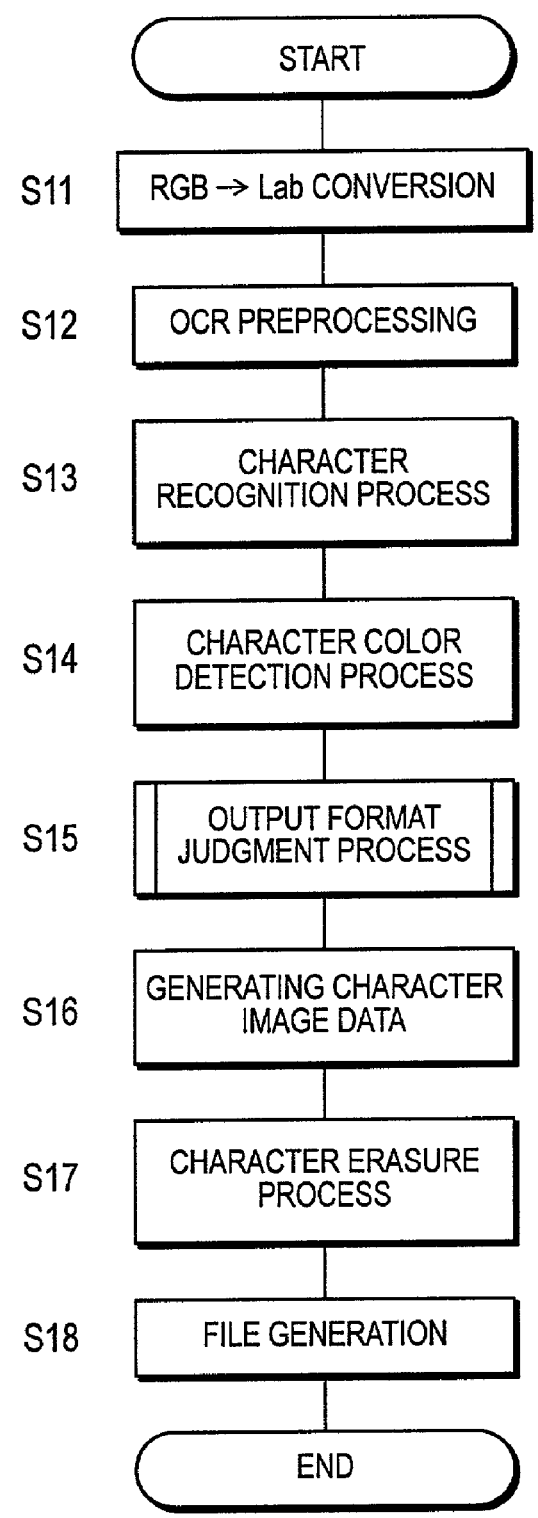
FIG. 6 is a flow chart that shows image processing.
Figure 7A:
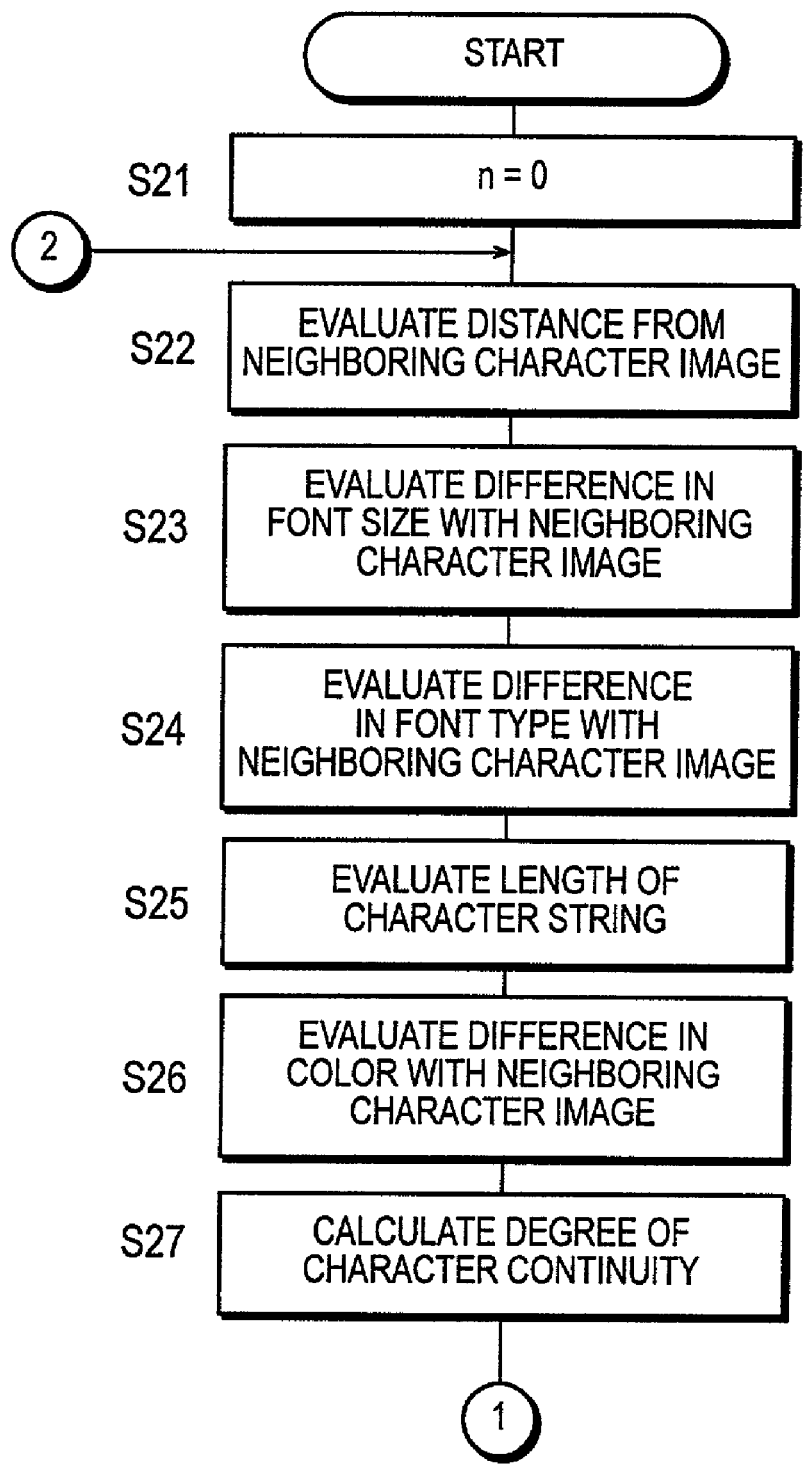
Figure 7B:
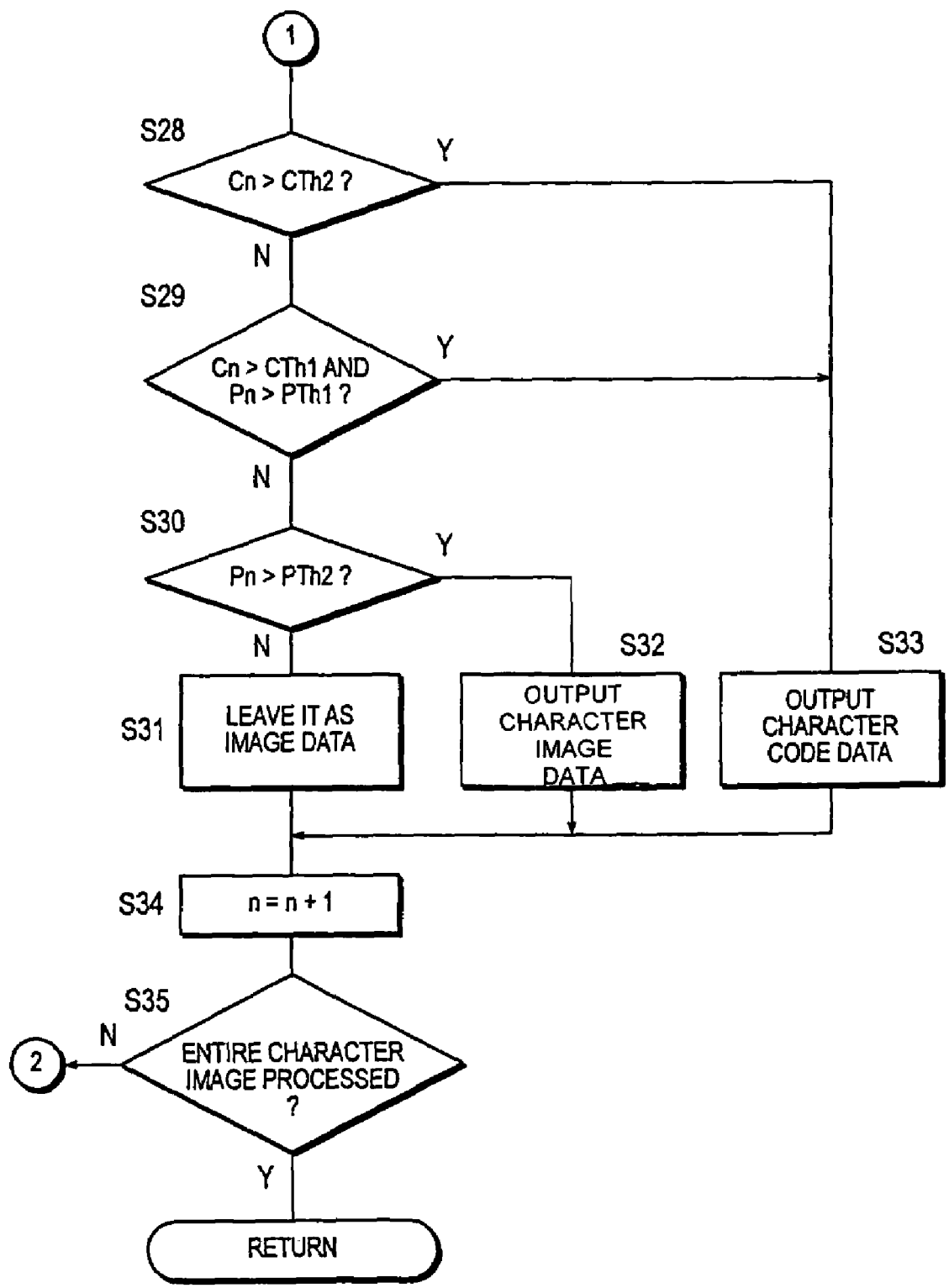
Figure 8:
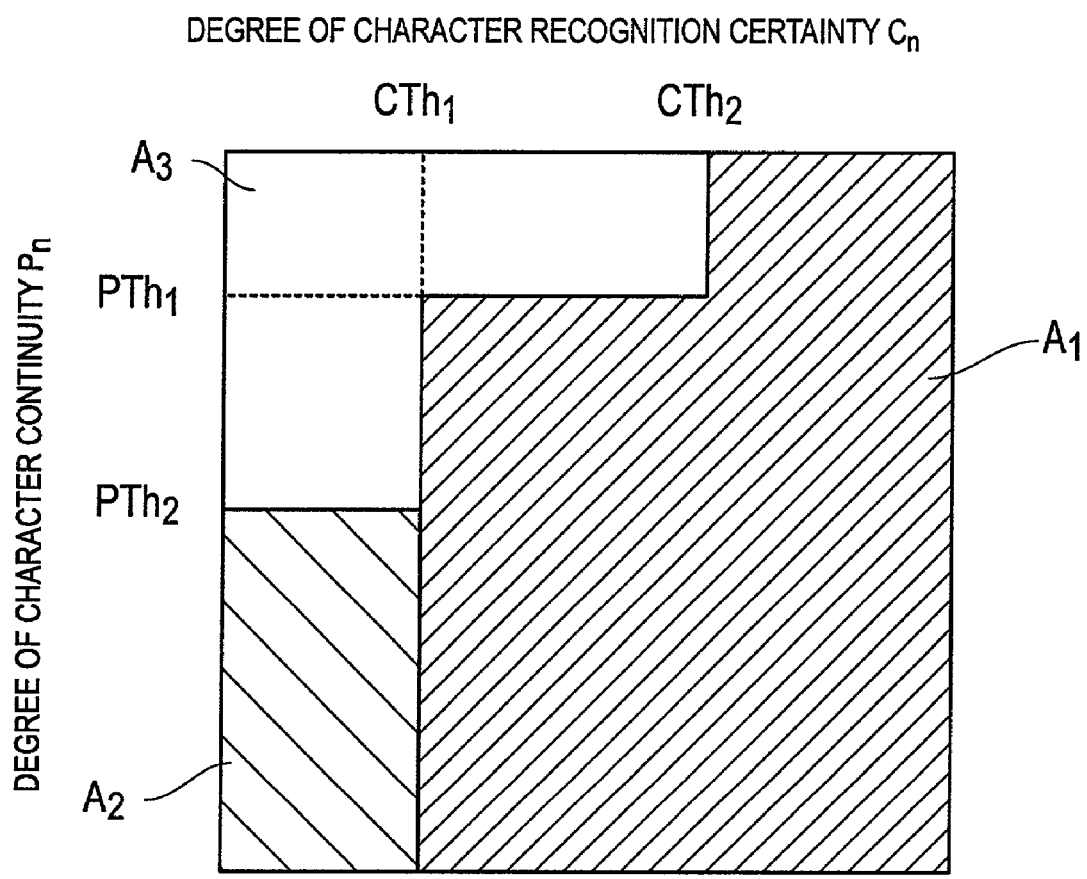
Figure 9C:
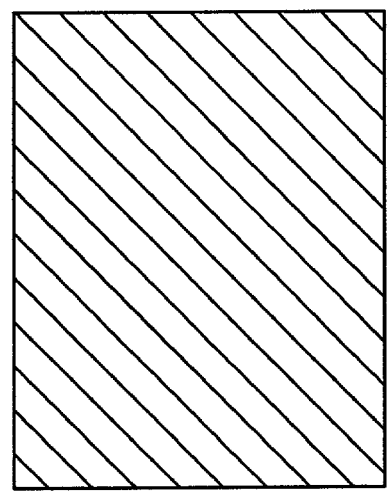
Figure 9B:
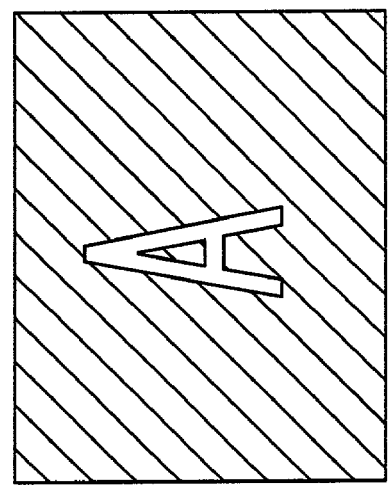
Figure 9A:
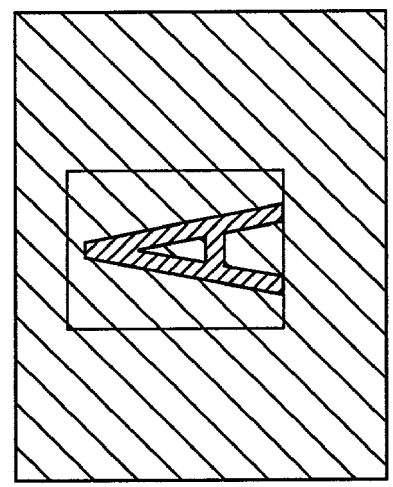
Figure 10:
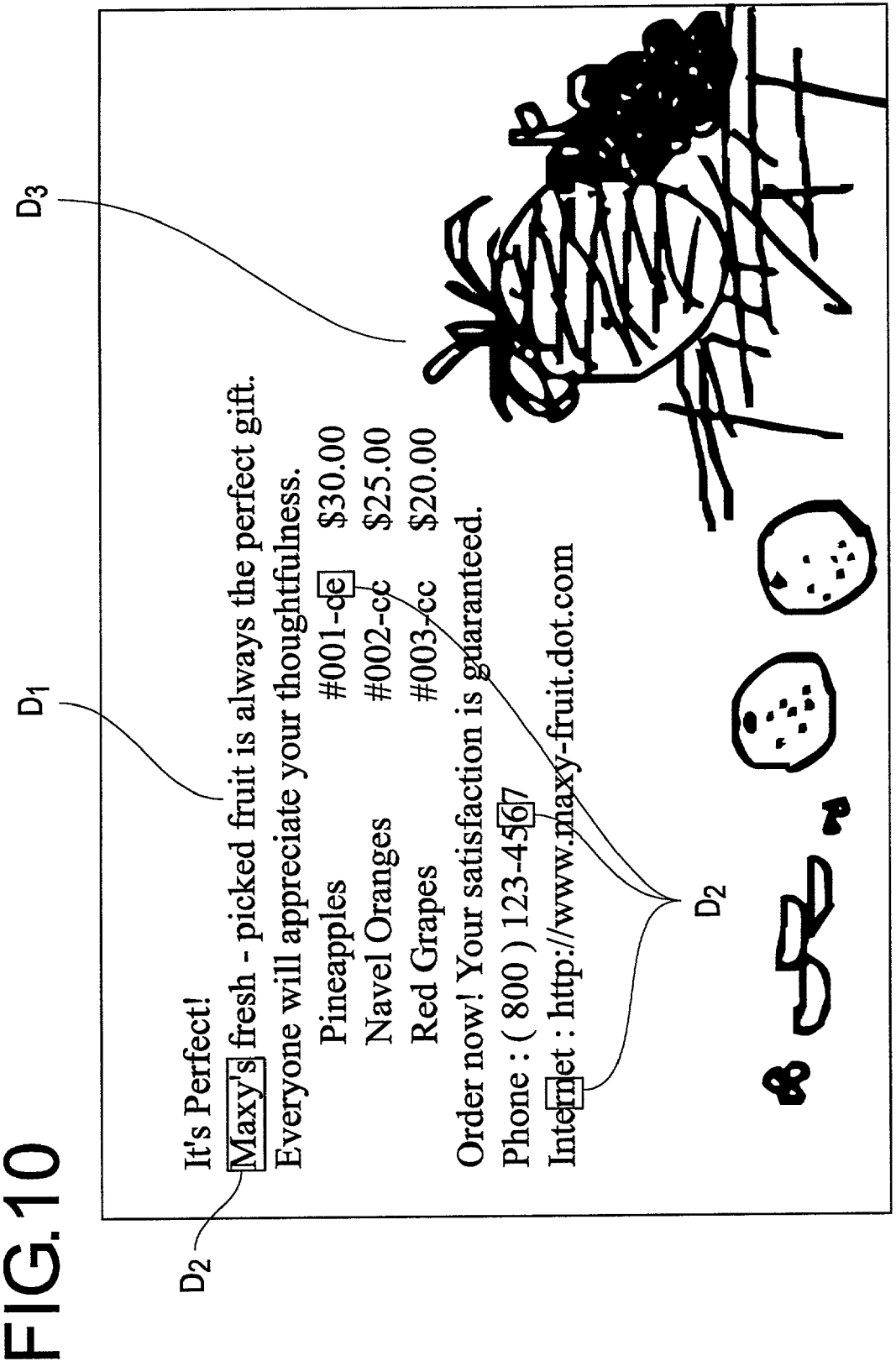
Figure 11:
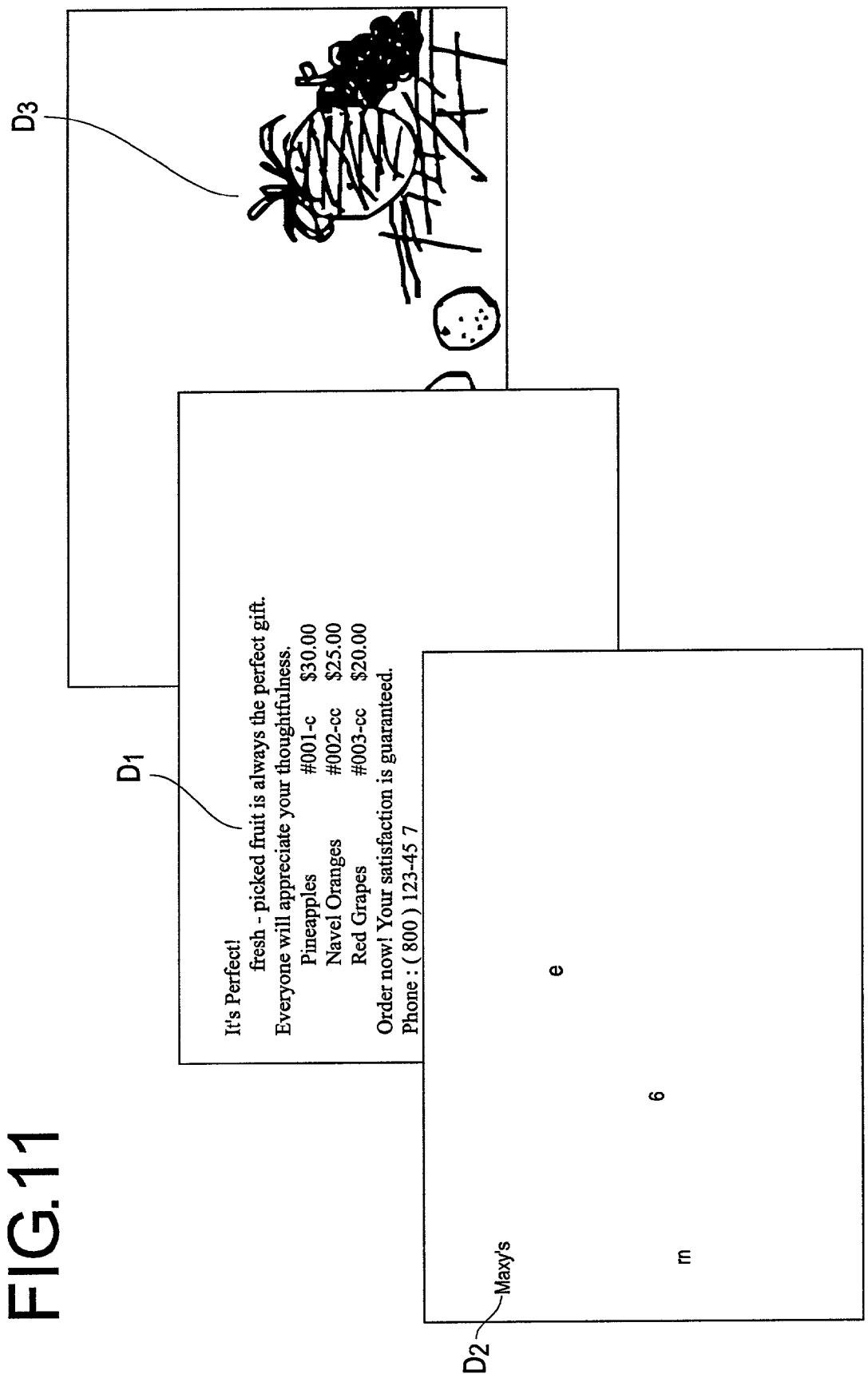
Figure 12:
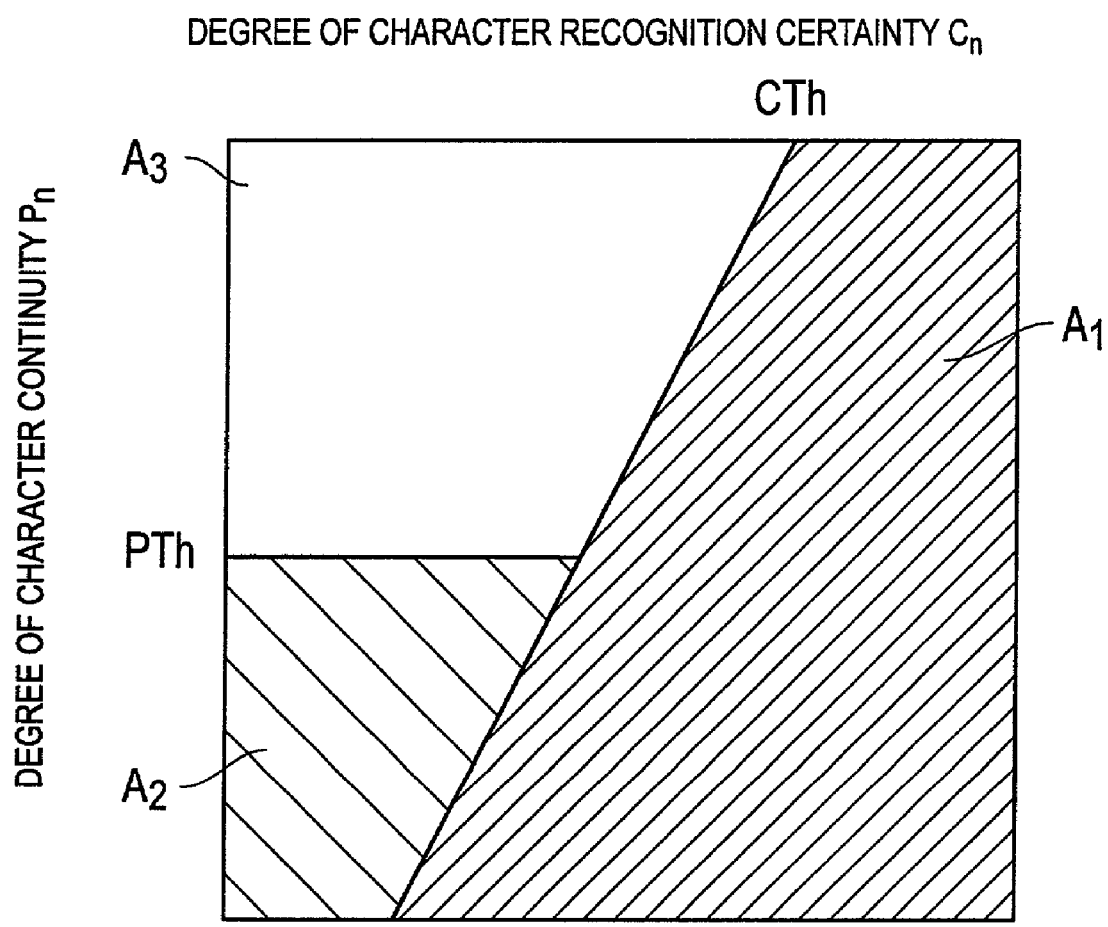

FIG. 7A and FIG. 7B constitute a flow chart of output format judgment process shown in FIG. 6;

FIG. 8 is a diagram for describing the judgment criteria for output formats;

FIG. 9A through FIG. 9C are diagrams for describing character erasure process;

FIG. 10 is a diagram of a case that lays out a combination of character code data, character image data, and image data consisting of graphic images, which are non-character images and thus are kept intact;

FIG. 11 is a diagram that shows the contents of character code data, character image data, and graphic image data separately; and FIG. 12 is a diagram for describing another judgment criterion for output formats.

DETAILED DESCRIPTION OF THE PREFERRED EMBODIMENT

The embodiments of this invention will be described below with reference to the accompanying drawings.

Figure 1:
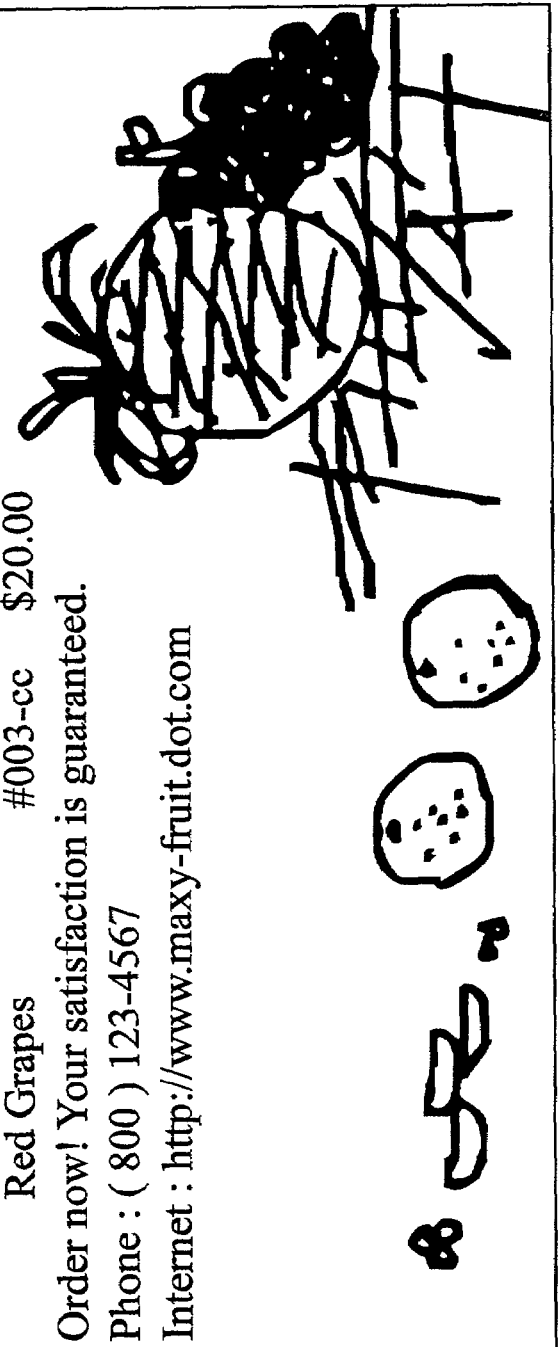
FIG. 1 is a drawing that shows an example document wherein non-character graphics are embedded into character areas.
Figure 3:
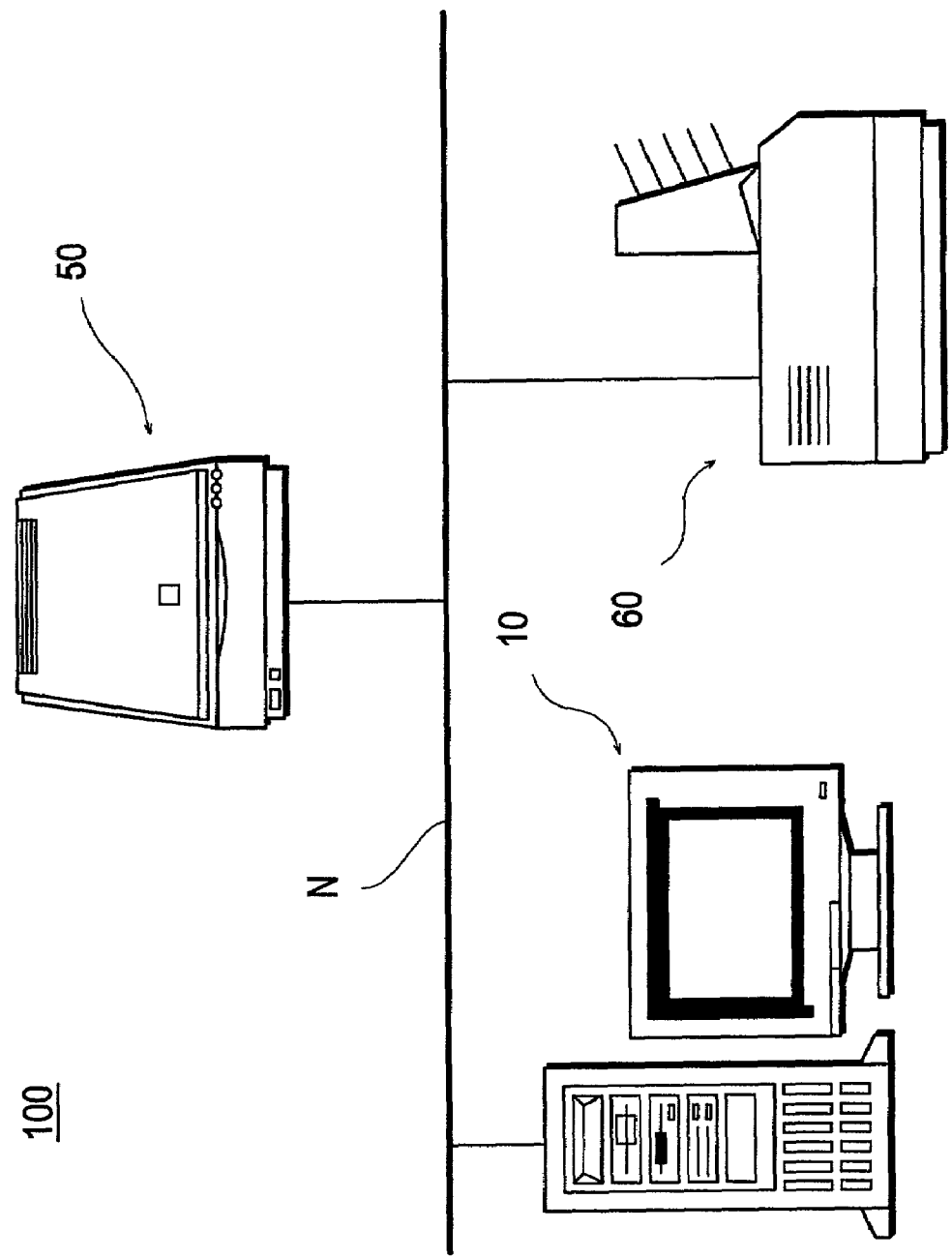
FIG. 3 is a drawing that shows a constitution of an information equipment system containing an image processing device according to an embodiment of the present invention.

FIG. 3 is a drawing that shows a constitution of an information equipment system containing an image-processing device according to an embodiment of the present invention.

An information equipment system 100 consists of information equipment such as a computer 10 capable of functioning as an image processing device, a scanner 50, or an image input device, and a printer 60, or an image output device, all of which are connected to a network N.

The computer 10, the scanner 50, and the printer 60 can mutually exchange data via the network N.

Figure 4:
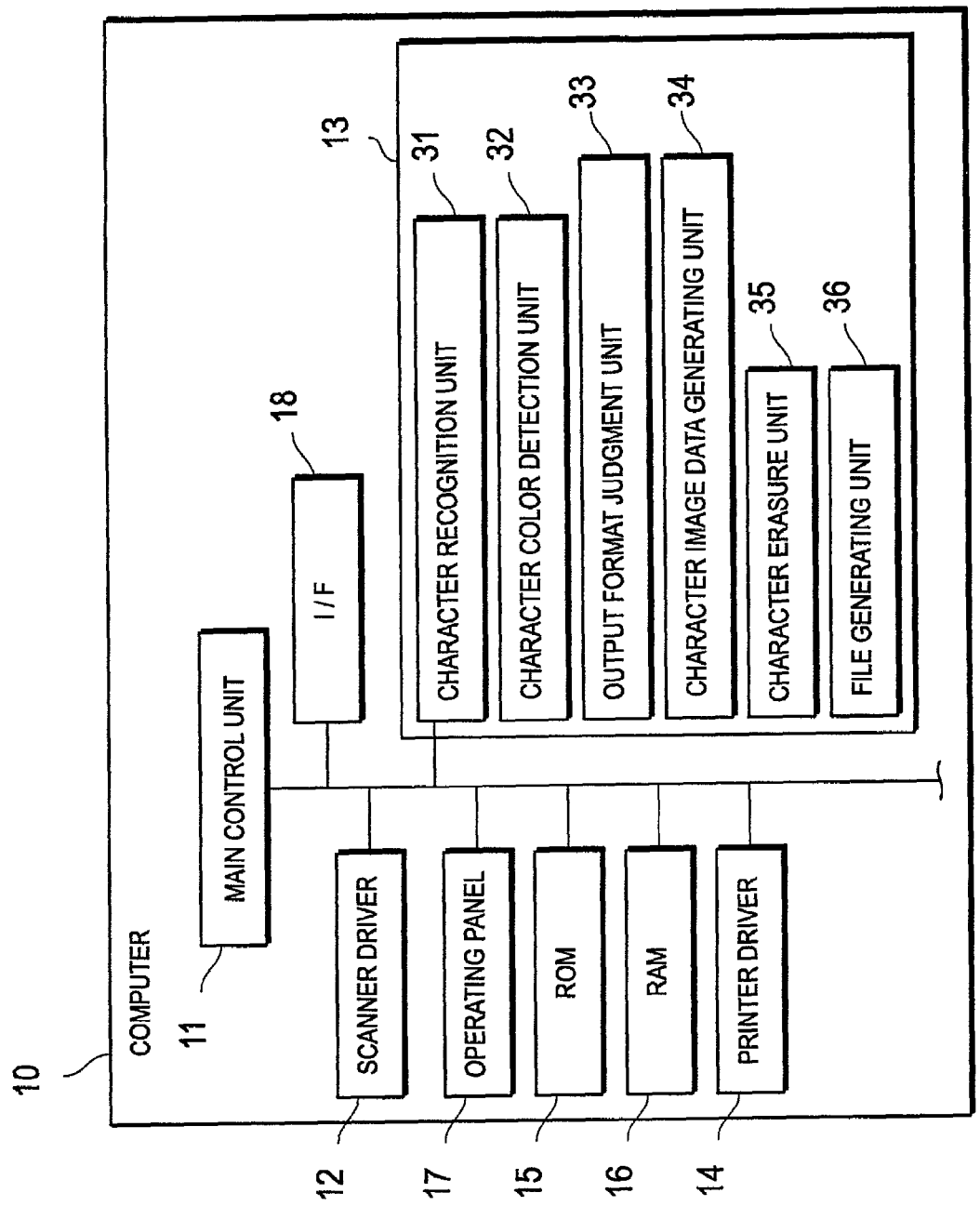
FIG. 4 is a block diagram that shows the general constitution of a computer shown in FIG. 3.

FIG. 4 is a block diagram that shows the general constitution of the computer 10. The computer 10 has an interface (I/F) 18, which exchanges data with various information equipment; a scanner driver 12, which controls the scanner 50; a printer driver 14, which controls the printer 60; a ROM 15, which stores prescribed programs and data; a RAM 16, which temporarily stores data; an operating panel 17, which is used by the user for viewing various information on displays and for inputting instructions; an image processing unit 13 (to be described in detail later), which performs various processes such as character recognition; and a main control unit 11 that controls various units mentioned above. The scanner driver 12 and the printer driver 14 are software and are stored in a memory device such as a hard disk (not shown).

The operating instruction for the information equipment system shown in FIG. 3 can be made through the operating panel 17 of the computer 10. The operating panel 17 in this embodiment is a virtual panel displayed on the display unit of the computer 10 and operating instructions are entered by means of operating such devices as the keyboard and the mouse, which are normally used for operating the computer 10.

For example, the operating panel 17 shows a scan & file button and a scan & print button. When the scan & file button is operated to instruct an operation, the scanner 50 will scan the document to produce image data, which will then be transmitted to the computer 10, image-processed by the image processing unit 13, and stored into the memory device of the computer 10 as a file of a specified format.

When the scan & print button is operated to instruct an operation, the image data obtained by the scanner 50 will be image-processed by the image processing unit 13, and transmitted to the printer 60 to be printed on paper.

Next, the image processing unit 13 will be described in detail in the following.

The image processing unit 13 includes a character recognition unit 31, a character color detection unit 32, an output format judgment unit 33, a character image data generating unit 34, a character erasure unit 35, and a file generating unit 36.

Figure 5:
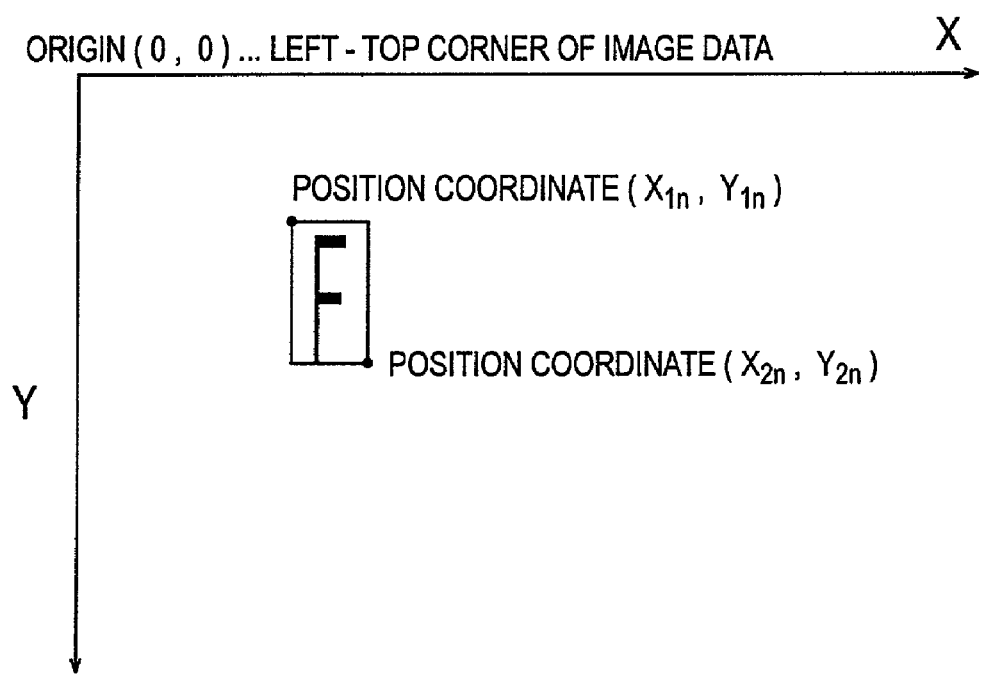
FIG. 5 is a diagram for describing the position information of each character image.

The character recognition unit 31 recognizes character codes from each character image to obtain character code data, and detects character recognition certainty, which is the degree of certainty of character code recognition. The method of recognizing a character code of a character image is done by matching the characteristic amount of each character image with a dictionary pattern which is stored in advance. The character recognition certainty is expressed by a scale of 10, where a larger value means a higher degree of recognition. The character recognition unit 31 recognizes the position information of a character image. The position information of a character image is obtained as the left top and right bottom coordinates of a rectangle that circumscribes the character image with the left top corner of the image data as the origin as shown in FIG. 5. The character recognition unit 31 further recognizes the attributes of a character such as the font type and size, the style of the character, i.e., bold or italic, underline, etc., from the character image.

The font type can be recognized by classifying into groups such as the serif group and the sans serif group. The font size can be obtained by comparing the size of the circumscribing rectangle of each character image with the size of the character expressing the character code data using a normal font when the character code is recognized. The information such as the height and width of the character, i.e., the font metric data, of specific representative fonts is stored in the memory as a data.

The character color detection unit 32 detects the color of each character image, whose character code is recognized.

The output format judgment unit 33 judges whether a character image, whose character code has been recognized, should be converted into character code data. In this embodiment, the output format judgment unit 33 checks all the character images, whose character codes have been recognized, and makes judgments individually whether it should convert them to character code data, or cutout character images from the input image data without converting them into character code data to generate character image data that are to be placed continuously without overlapping with adjacent character code data, or leave input image data intact in the original positions. Among the character images, whose character codes have been recognized, the character image data generating unit 34 cuts out the character images, for which judgments have been made to have character image data to be generated, from input image data.

The character erasure unit 35 erases character images that have been converted to either character code data or character image data from the original image data, i.e., the input color image data.

The file generating unit 36 generates a file of a specified format using character code data and character image data obtained from character images contained in the inputted image data.

The operation of the image processing unit 13 will be described below referring to the flowcharts shown in FIG. 6, FIG. 7A, and FIG. 7B.

First, a conversion in the color space is made from the RGB color system to the Lab color system on the image data obtained by scanning a document by the scanner 50 (S11). The Lab color system is capable of handling data as common color information on the network N without any dependency on any specific information equipment such as scanners and printers.

Next, the OCR preprocessing will be performed in order to form the image data that is to be inputted into the character recognition unit 31 (S12). Because the character recognition unit 31 is going to recognize a character code by means of extracting attributes from the monochromatic binary image data in the later stage, the OCR preprocessing first binarizes the color image data represented by the Lab color system to generate monochromatic binary image data having character images in black and the background image in white. By detecting the L, a and b levels of the character images and the background image, the present embodiment performs the binarization process so that the character codes can be sufficiently recognized from the character images in the image data obtained by scanning the document even if the document contains color characters against a white background or black characters against a color background. In addition to this, the OCR preprocessing performs the removal of noises such as isolated points, the compensation for a case where the document is scanned in a skewed condition, the compensation for character images which are deformed or faint, etc.

The monochromatic binary image data obtained by the OCR preprocessing is inputted into the character recognition unit 31 to have the character recognition processing to be performed on it (S13). The character recognition unit 31 recognizes the character code of each character image in a character area after extracting character areas where character images exist from the monochromatic binary image data. The character recognition unit 31 is also capable of detecting the character recognition certainty, which is the degree of certainty for recognizing character codes, and further recognizes the character's attributes such as the font type and size, the style of the character, i.e., bold or italic, underline, etc., in addition to the position information of the character images.

Next, the character color detection process will be conducted (S14). In other words, the character color detection unit 32 detects the color of each character image once the character code is recognized. Here, it uses the image data, which has been color converted into the Lab color system. The color detection of the character image is done by reading the values of L, a, and b in the character area, where the character image exists in the image data, and calculating the average values for the L, a, and b values for all the pixels that constitute the character image. The distinction between the pixels of the character image and the background image is done using the monochromatic binary image data obtained in the OCR preprocessing. Thus, it is possible to determine that black pixels in the monochromatic binary image data are the pixels of the character image and white pixels in the same are the pixels of the background image within the circumscribing rectangle of each character image.

In case of outputting a character image after converting it into character code data, the character code data is outputted by specifying a color based on the color information of each character image detected by the character color detection unit 32. This will recreate the character color on the document.

Next, the output format judgment process for individual character images within the character areas are performed (S15). The output format judgment unit 33 judges whether the character images, whose character codes have been recognized, should be converted into character code data.

The output format judgment unit 33 makes its judgment on output format based on two basic judgment values. The first value for the judgment of the output format is the character recognition certainty, which is the degree of certainty for recognizing character codes. The second value for the judgment of the output format is the character continuity degree, which is the degree of continuity with neighboring characters, of a character image for which a character code has been recognized. The character continuity degree is a value obtained by evaluating the character-like characteristic from the continuity standpoint of the character attributes recognized from its character image.

From the character images, whose character codes have been recognized, the output format judgment unit 33 classifies the character images that are judged not to be converted into character code data into two output formats. If the degree of character recognition certainty is low for a given character image, although it is certain that it is a character image and even its character code has been recognized, the output format judgment unit 33 makes a judgment to cut out its character image from the input image data to generate a character image data that can be placed continuously with and not overlapping its neighboring character code data. If it is suspected that a character image, to which a character code has been assigned, has been recognized mistakenly and thus has been assigned character code despite the fact that it is a graphic image and non-character image, the output format judgment unit 33 makes a judgment to leave the character image intact in its original position in the input image data.

The output format judgment process for character images, whose character codes have been recognized, will be described in detail in the following.

the character recognition unit 31 outputs various information about individual character image that include character attributes, for example, the type of font such as the serif group and the sans serif group, font size, style such as bold and italic, underline, etc., the character recognition certainty, and position information of a character for which a character code has been recognized, in addition to the character code data.

The character-likeness of a character image is evaluated by detecting the continuity of the character image concerning the position of the character image and the character attributes based on the above-mentioned information provided by the character recognition unit 31. Although the system extracts character areas that have strong character-likeness from image data by checking position relations with character images in the surround area to a degree in the character recognition process, there can be a circumstance where an extracted character area includes non-character images or graphic images that are mistaken as character images. In order to avoid such isolated character images from being converted into character code data by mistake, the system of this embodiment makes a judgment on every character image whether the character image should be converted into character code data after the character code has been recognized for the particular character image.

The character continuity degree, in other words, the evaluation amount of the character-likeness, is detected by checking five items, i.e., the distance between a character image whose character code has been recognized and its neighboring character images, the difference in font size between a character image whose character code has been recognized and its neighboring character images, the difference in font type between a character image whose character code has been recognized and its neighboring character images, the length of a continuous character image string in which a character image whose character code has been recognized is contained, and the difference in color between a character image whose character code has been recognized and its neighboring character images, and then calculating the evaluation point for continuity of said character image for each item mentioned above.

More specifically, a variable "n" that represents the sequence number of each character image in question is initialized as shown in FIG. 7A (S21).

The first evaluation point is calculated based on the distance between a character image whose character code has been recognized and its neighboring character images (S22). The position information (refer to FIG. 5) of ± k pieces of character images before and after the character image in question is determined and the first evaluation point $P1_n$, is calculated based on the following formula. The suffix in the formula represents the sequence number of each character image (hereinafter the same).

$$P1_n = M1 - \min\left[\sum_{i=0}^{k}\{(X1_{n+i+1} - X2_{n+i}) + (Y1_{n+i+1} - Y2_{n+i})\},\right.$$

-continued
$$\left.\sum_{i=-k}^{0}\{(X1_{n+i+1} - X2_{n+i}) + (Y1_{n+i+1} - Y2_{n+i})\}\right]$$

wherein, if $P1_n<0$, $P1_n=0$; M1: the maximum value of the first evaluation point; X1: left X coordinate of the circumscribing rectangle of the character image whose character code has been recognized; X2: right X coordinate of the circumscribing rectangle of the character image whose character code has been recognized; Y1: upper Y coordinate of the circumscribing rectangle of the character image whose character code has been recognized; and Y2: lower Y coordinate of the circumscribing rectangle of the character image whose character code has been recognized.

As can be seen from the above formula, the larger the distances between the character image in question and its neighboring character images is, the smaller the first evaluation point is. In other words, it shows that the further the character image in question is from its neighboring character images, the smaller the continuity is, and hence the lower its probability of being a character image is.

It is also seen from the above formula that, in order to consider, for example, a character image located at the left end or right end of a row of multiple character images, the distance between the character image in question and its neighboring character image on its right as well as the distance between the character image in question and its neighboring character image on its left are determined, and the smaller of the two is used for calculation of the evaluation point.

Next, the second evaluation point is calculated based on the difference in font size between a character image whose character code is recognized and its neighboring character images (S23). The font sizes of ± k pieces of character images before and after the character image in question are determined and the second evaluation point $P2_n$, is calculated according to the following formula:

$$P2_n = M2 - \left(\sum_{i=-k}^{k}|S_{n+i} - S_n|\right) \bigg/ \left\{\left(\sum_{i=-k}^{k}S_{n+i}\right) \bigg/ (2k+1)\right\}$$

wherein, if $P2_n<0$, $P2_n=0$; M2: the maximum value of the second evaluation point; and S: font size.

The denominator of the above formula represents the average font size of the neighboring character images. As can be seen from the above formula, the larger the difference in font size between the character image in question and its neighboring character images is, the smaller the continuity is, and hence the smaller the second evaluation point is.

Next, the third evaluation point is calculated based on the difference in font type between the character image whose character code is recognized and its neighboring character images (S24). The font types of ± k pieces of character images before and after the character image in question are determined and the third evaluation point $P3_n$ is calculated according to the following formula, where Nf is the number of character images whose font types are different from that of the character image in question:

$$P3_n = M3 - Nf$$

wherein, if $P3_n<0$, $P3_n=0$; and M3: the maximum value of the third evaluation point.

As can be seen from the above formula, the larger the difference in font type between the character image in question and its neighboring character images is, the smaller the continuity is, and hence the smaller the third evaluation point is.

Next, the fourth evaluation point is calculated based on the length of a string of continuous character images in which the character image whose character code is recognized is included (S25). The space between the adjacent circumscribing rectangles of individual character images are determined before and after the character image in question, and if a particular space is larger than a prescribed threshold value TH, it is judged as the edge of said character image string. It is preferable to vary the threshold value TH according to the average size of the neighboring character images. Assuming that the character image in question is the n-th character image and a group of character images from the i1-th character image existing on the left side of the character image in question to the i2-th character image on the right side of the character image in question constitutes a single string of character images, the fourth evaluation point $P4_n$ is calculated according to the following formula:

$$P4n = i2 - i1 + 1$$

wherein, if $P4n > M4$, $P4n = M4$; and M4: the maximum value of the fourth evaluation point.

As can be seen from the above formula, the longer the character image string is, the larger the continuity is, and hence the larger the fourth evaluation point is.

Lastly, the fifth evaluation point is calculated based on the difference in color between the character image whose character code has been recognized and its neighboring character images (S26). The colors of ± k pieces of character images before and after the character image in question are determined and the fifth evaluation point $P5_n$ is calculated according to the following formula:

$$P5_n = M5 - \left( \sum_{i=-k}^{k} |L_{n+i} - L_n| + \sum_{i=-k}^{k} |a_{n+i} - a_n| + \sum_{i=-k}^{k} |b_{n+i} - b_n| \right)$$

wherein, if $P5_n < 0$, $P5_n = 0$; M5: the maximum value of the fifth evaluation point; and L, a, b: values expressed in character colors in the Lab color system.

As can be seen from the above formula, the larger the difference in color between the character image in question and its neighboring character images is, the smaller the continuity is, and hence the smaller the fifth evaluation point is.

From the first through fifth evaluation points obtained as above, the degree of character continuity Pn as the general evaluation point can be calculated from the following formula (S27).

$$Pn = W1*P1_n + W2*P2_n + W3*P3_n + W4*P4_n + W5*P5_n$$

wherein, W1 through W5 are the weights to be applied to each evaluation point and can be arbitrarily set.

In the meanwhile, the degree of character recognition certainty Cn, which is the degree of certainty in recognizing the corresponding character code, is obtained for each character image in addition to the degree of character continuity Pn.

The output format judgment unit 33 makes a judgment on the output format for each character image whose character code has been recognized based on the degree of character recognition certainty Cn and the degree of character continuity Pn, which is the degree of continuity with the neighboring character images.

FIG. 8 is a diagram for describing the judgment criteria for the output format.

First, two threshold values are set up as the threshold of the degree of character recognition certainty Cn, a smaller threshold CTh1 and a larger threshold CTh2, and also two threshold values are set up as the threshold of the degree of character continuity Pn, a smaller threshold PTh1 and a larger threshold PTh2.

The output format judgment unit 33 first judges that a character image having a degree of character recognition certainty Cn larger than the larger threshold value CTh2 should be converted into character code data (S28: Yes; S33). The output format judgment unit 33 also judges that a character image having a degree of character recognition certainty Cn larger than the smaller threshold value CTh1 and a degree of character continuity Pn is larger than the smaller threshold value PTh1 should be converted into character code data on the judgment that the character code is correctly recognized (S29: Yes; S33). In other words, a character image having an extremely large degree of character recognition certainty (Cn>CTh2) is judged to be converted into character code data, and a character image having a medium degree of character recognition certainty (CTh1<Cn<CTh2) is judged to be converted into character code data only when the degree of character continuity Pn is larger than PTh1.

Character images that are judged that they should not be converted into character code data at the above-mentioned two steps, S28 and S29, are further classified into two output format categories based on their degrees of character continuity Pn. Specifically, of the character images that are judged not to be converted into character code data, those character images with the degrees of character continuity Pn larger than the threshold value PTh2 are judged to have their character image data generated by cutting out their character images from the input image data. On the other hand, of the character images that are judged not to be converted into character code data, those character images with the degrees of character continuity Pn smaller than the threshold value PTh2 are judged to be left intact in their original positions in the input image data.

As can be seen from the above, the character images whose character codes are recognized by the character recognition unit 31 are finally classified into three categories by the output format judgment unit 33. Specifically, individual character images are divided into a category of character images, whose character codes are recognized beyond doubt, and which are consequently judged to be outputted as character code data (area A1 in FIG. 8); a category of character images, which are judged to be character images beyond doubt but doubtful as to whether correct character code have been recognized, and which are consequently judged to be outputted as character image data that are arranged to be continuous to but not overlapping with neighboring character code data (A2 area in FIG. 8); and a category of character images, which have little continuity with neighboring character images, whose character codes have been mistakenly recognized despite the fact that they are non-character, graphic images, which are consequently judged to be left in the input image data intact at their original positions (A3 area in FIG. 8).

After executing the above process, the variable "n" that represents the sequence number of the character image in question is incremented (S34), and the process is repeated until all character images in the image data are treated (S35).

When the judgment process of the output format is completed on all character images in the image data, the program returns to the main flow chart shown in FIG. 6 to generate character image data (S16). The character image data generating unit 34 generates character image data by cutting out the image data within the circumscribing rectangle of each character image according to the position information of the character images outputted by the character recognition unit 31.

The reason that the character image to be outputted as the character image data is cut out individually without leaving it in its original position as the image data obtained by scanning the document, is so that the character code data and the character image data do not overlap each other. In general, the input font and the output font seldom match with each other, so that the position where character code data converted from a character image is disposed will be slightly off the position of said character image within the input image data. As a result, if a character image is left as image data in its original position without cutting it out as a character image and character code data is disposed, it can cause a problem that the character code data overlaps with the character image in the original image data obtained by scanning the document. Therefore, the present embodiment cuts out each character image to produce character image data and disposes the cutout character image data in succession to the place where the character code data is disposed with the output font.

In generating character image data, the character image data generating unit 34 applies to image data within circumscribing rectangle of corresponding character image such processes as the edge enhancement and the gamma conversion applicable to said character image. This makes it possible to recreate even the character image data expressed in bit maps in sharp characters when printed on paper.

Next, it performs the character erasure process (S17). After obtaining character code data or character image data from a character image, the character erasing unit 35 erases the original character image, from which the character code data or the character image data has been obtained, from the color image data obtained by scanning the document.

FIG. 9A through FIG. 9C are the drawings to describe the character erasure process. As shown in the drawings, a portion of the image data within the circumscribing rectangle of an individual character image (FIG. 9A) that corresponds to the character image is erased (FIG. 9B), and is complimented by the surrounding image data (FIG. 9C). The portion to be erased can be obtained by a process of expanding the black area of a monochromatic binary image data by two to three pixels in the circumscribing rectangle of said character image. The image data remaining after removing the portion that corresponds to the character image from the original image data obtained by scanning the document still holds image data other than the character image, i.e., images such as a photograph and a line drawing, or a background image as shown in FIG. 9B.

By performing the abovementioned processes, as an example, character code data D1 and character image data D2 are obtained from the character image within the image data, and image data D3 that is still holding graphic images that are non-character images are also obtained shown in FIG. 10. FIG. 11 is a diagram that shows the contents of character code data, character image data, and graphic image data separately. As shown in FIG. 10 and FIG. 11, non-character graphic images for which character codes are mistakenly recognized and exist as isolated character images are prevented from being converted into character code data and will not be outputted as mistakenly recognized character code data in the portion of the graphic image as shown in FIG. 2.

These character code data, character image data, and the image data are disposed in the page in a prescribed file format and stored (S18). If the scan & print button is selected, the specified data will be transmitted to the printer 60 and printed on paper.

As can be seen from the above, after a character code has been recognized from a character image, a judgment is made on whether said character image should be converted into a character code data based on the degree of character continuity, so that this embodiment can efficiently prevent mistakenly recognizing a character code in a non-character graphic image and outputting character code data.

Moreover, since it becomes possible to remove mistakenly recognized character code data not having to set up a higher threshold value for the degree of character continuity, it is possible to maintain a high ratio of conversion from character images in input image data to character code data.

It is obvious that this invention is not limited to the particular embodiments shown and described above but may be variously changed and modified without departing from the technical concept of this invention.

For example, although it was described in the above embodiments to convert the color space of the input image data from the RGB color system to the Lab color system in the image processing, it is also possible to conduct the image processing using other color space such as the RGB color system of the image data obtained by scanning the document with the scanner 50.

The method of calculating the first through fifth evaluation points addressing the continuity of character images is not limited to the formulas given above. For example, the second evaluation point P2n can be calculated with the following formula:

$$P2_n = M2 - \sum_{i=-k}^{k} |S_{n+i+1} - S_{n+i}|$$

Moreover, although the degree of character continuity Pn was determined considering the entire first through fifth evaluation points in the above embodiments, it is not limited to it. The degree of character continuity Pn can be determined based on only one or a combination of two or more points of the first through fifth evaluation points if so desired.

Moreover, although it was described in the above embodiments that the output format judgment unit 33 makes a judgment on the output format concerning each character image based on the degree of character recognition certainty Cn and the degree of character continuity Pn according to the method shown in FIG. 8, the invention is not limited to it. The output format judgment unit 33 can make a judgment on the output format on each character image based on a method of continuously varying the threshold value CTh of the degree of character recognition certainty Cn according to the degree of character continuity Pn as shown in FIG. 12.

Moreover, if it is desired to use a simpler output format judgment, it is possible for the output format judgment unit 33 to make a judgment whether character images whose character codes have been recognized should be converted into character code data using the degree of character continuity detecting only whether the character codes have been recognized from the character images without detecting the degree of certainty of recognizing character codes from character images quantitatively (e.g., by a scale of 10).

Moreover, although it was described in the above embodiments using a computer as an example of the image processing device, the image processing device of the present invention is not limited to it. The invention can be applied to a scanner that performs the processes described above and transmits the result to a computer or a printer, a printer that receives image data directly from the scanner and performs the processes described above, or a color digital copying machine that performs all the processes from scanning of a document to printing on paper.

The control of the image processing in the embodiments described above is performed by the main control unit 11 as it executes a specified program, which contains the processing sequence mentioned above (refer to FIG. 6, FIG. 7A and FIG. 7B), and this program can be provided also by means of computer readable recording medium (e.g., floppy disk, CD-ROM). The specified program can be provided either as an application software program, or can be built into information equipment such as a computer, digital copying machine, scanner and printer as a function of them, or the control server as a part of their functions. In the present invention, a program product includes a program itself and a computer readable recording medium that contains the program.

What is claimed is:

1. An image processing device comprising:
    a character recognition unit that recognizes character codes from character images in image data;
    a conversion unit for converting character images to character code data according to character codes; and
    a judgment unit that obtains a degree of character continuity, which is a degree of continuity between a character image and neighboring character images thereof, for any character image for which a character code has been recognized by said character recognition unit, and that makes a judgment, based on the degree of character continuity, whether said character image should be represented by character code data only.

2. An image processing device as claimed in claim 1, wherein
    said judgment unit obtains said degree of character continuity based on at least one of:
    a distance between said character image for which a character code has been recognized and neighboring character images thereof;
    a difference in font size between said character image for which a character code has been recognized and neighboring character images thereof;
    a difference in font type between said character image for which a character code has been recognized and neighboring character images thereof;
    a length of a character string in which said character image for which a character code has been recognized exists; and
    a difference in color between said character image for which a character code has been recognized and neighboring character images thereof.

3. An image processing device as claimed in claim 1, wherein
    said judgment unit makes a judgment to convert said character image into character code data when said degree of character continuity is larger than a first prescribed value.

4. An image processing device as claimed in claim 1, wherein
    said character recognition unit detects a degree of character recognition certainty, which is a degree of certainty in recognizing a character code from a character image; and
    said judgment unit makes the judgment further based on said degree of character recognition certainty.

5. An image processing device as claimed in claim 4, wherein
    said judgment unit makes a judgment that said character image should be converted to character code data when said degree of character continuity is larger than a first prescribed value and said degree of character recognition certainty is larger than a second prescribed value.

6. An image processing device as claimed in claim 5, further comprising:
    a character image data generating unit that cuts out character images from said image data to generate character image data, wherein
    said judgment unit makes a judgment that said character image data generating unit should generate said character image data for any character image whose degree of character continuity is larger than a third prescribed value, which is smaller than said first prescribed value, among character images judged not to be converted into character code data.

7. An image processing device as claimed in claim 5, wherein
    said judgment unit makes a judgment that any character image whose degree of character continuity is smaller than a third prescribed value, which is smaller than said first prescribed value, should be left intact in said image data, among character images judged not to be converted into character code data.

8. An image processing device as claimed in claim 1, further comprising:
    a file generating unit that generates an electronic file containing character code data converted by said conversion unit.

9. An image processing device as claimed in claim 1, wherein the image data representing said character image is any one of input image data and character image data.

10. A program for image processing, said computer program causing a computer to execute a process comprising the steps of:
    1) recognizing character codes from character images in image data;
    2) obtaining a degree of character continuity between a character image and neighboring character images thereof for any character image for which a character code has been recognized in said step 1);and
    3) making a judgment, based on the degree of character continuity, whether said character image should be represented by character code computer-readable medium encoded with a computer data only.

11. A computer-readable medium as claimed in claim 10, wherein
    said degree of character continuity is obtained in said step 2) based on at least one of:
    a distance between said character image for which a character code has been recognized and neighboring character images thereof;

a difference in font size between said character image for which a character code has been recognized and neighboring character images thereof;

a difference in font type between said character image for which a character code has been recognized and neighboring character images thereof;

a length of a character string in which said character image for which a character code has been recognized exists; and a difference in color between said character image for which a character code has been recognized and neighboring character images thereof.

12. A computer-readable medium as claimed in claim 10, wherein a judgment is made in said step 3) that said character image should be converted into character code data when said degree of character continuity is larger than a first prescribed value.

13. A computer-readable medium as claimed in claim 10, wherein a degree of character recognition certainty is further detected in said step 1), which is a degree of certainty in recognizing a character code from a character image; and a judgment is made at said step 3) on whether said character image should be converted into character code data based on said degree of character continuity and said degree of character recognition certainty.

14. A computer-readable medium as claimed in claim 13, wherein a judgment is made in said step 3) that said character image should be converted into character code data when said degree of character continuity is larger than a first prescribed value and said degree of character recognition certainty is larger than a second prescribed value.

15. A computer-readable medium as claimed in claim 14, wherein said process further comprising the step of:

4) cutting out character images from said image data to generate character image data, and a judgment is made in said step 3) that character image data should be generated for any character image whose degree of character continuity is larger than a third prescribed value, which is smaller than said first prescribed value, among character images judged not to be converted into character code data.

16. A computer-readable medium as claimed in claim 14, wherein a judgment is made in said step 3) that any character image whose degree of character continuity is smaller than a third prescribed value, which is smaller than said first prescribed value, should be left intact in said image data, among character images judged not to be converted into character code data.

17. A computer-readable medium as claimed in claim 10, wherein said process further comprising the step of:

5) generating an electronic file containing character code data converted from said character images.

18. A computer-readable medium as claimed in claim 10, wherein the image data representing said character image is any one of input image data and character image data.

19. An image processing system, comprising:

a scanning device for scanning documents to obtain image data; and an image processing device comprising:

a character recognition unit that recognizes character codes from character images in image data;

a conversion unit for converting character images to character code data according to character codes; and a judgment unit that obtains a degree of character continuity, which is a degree of continuity between a character image and neighboring character images thereof, for any character image for which a character code has been recognized by said character recognition unit, and that makes a judgment, based on the degree of character continuity, whether said character image should be represented by character code data only.

20. An image processing system as claimed in claim 19, wherein said image processing device further comprises a file generating unit that generates an electronic file containing character code data converted by said conversion unit; and said image processing system further comprises a printer that prints images based on said electronic file.

21. An image processing system as claimed in claim 19, wherein the image data representing said character image is any one of input image data and character image data.

* * * * *